United States Patent

Cebollero

[11] Patent Number: 5,819,595
[45] Date of Patent: Oct. 13, 1998

[54] SECURITY BRAKE MECHANISM

[75] Inventor: Carlos Gabas Cebollero, Barcelona, Spain

[73] Assignee: Fico Cables, S.A., Barcelona, Spain

[21] Appl. No.: 817,214
[22] PCT Filed: Jul. 17, 1996
[86] PCT No.: PCT/ES96/00149
  § 371 Date: Mar. 27, 1997
  § 102(e) Date: Mar. 27, 1997
[87] PCT Pub. No.: WO97/08027
  PCT Pub. Date: Mar. 6, 1997

[30] Foreign Application Priority Data

Aug. 31, 1995 [ES] Spain .................................. 9501708

[51] Int. Cl.⁶ .............................. G60T 7/08; G05G 5/08
[52] U.S. Cl. ............................................. 74/535; 74/537
[58] Field of Search ............................ 74/535, 537, 529, 74/501.5 R

[56] References Cited

U.S. PATENT DOCUMENTS

| 4,512,210 | 4/1985 | Gurney | 74/535 |
| 4,819,501 | 4/1989 | Kraus et al. | 74/535 X |
| 4,841,798 | 6/1989 | Porter et al. | 74/501.5 R |
| 5,001,942 | 3/1991 | Boyer | 74/535 |
| 5,272,935 | 12/1993 | Heinemann et al. | 74/535 X |

Primary Examiner—Charles A. Marmor
Assistant Examiner—MaryAnn Battista
Attorney, Agent, or Firm—Michael J. Striker

[57] ABSTRACT

A safety brake mechanism incorporates a self-regulating device and a self-adjusting device, the first including a traction body (36) attached to one end (44) of the steel cable (60) of the control cable and a traction spring (37) coupled to the pivot pin (5) of the brake lever (4), and a thrust body (47) coupled to the pivot pin (8) of the ratchet (6) lever (7), with both bodies (36, 47) having respective toothed portions (41, 52) for mutual meshing, so that when the brake lever (4) is in the rest position, the spring (37) subjects said end (44) to traction, permanently adjusting the length of the sheathed portion of the control cable, while the self-adjusting device includes, in the traction body (36) and on the support (2) of the mechanism corresponding orifices (42, 58) traversed ex-works by a retaining pin (59).

4 Claims, 4 Drawing Sheets

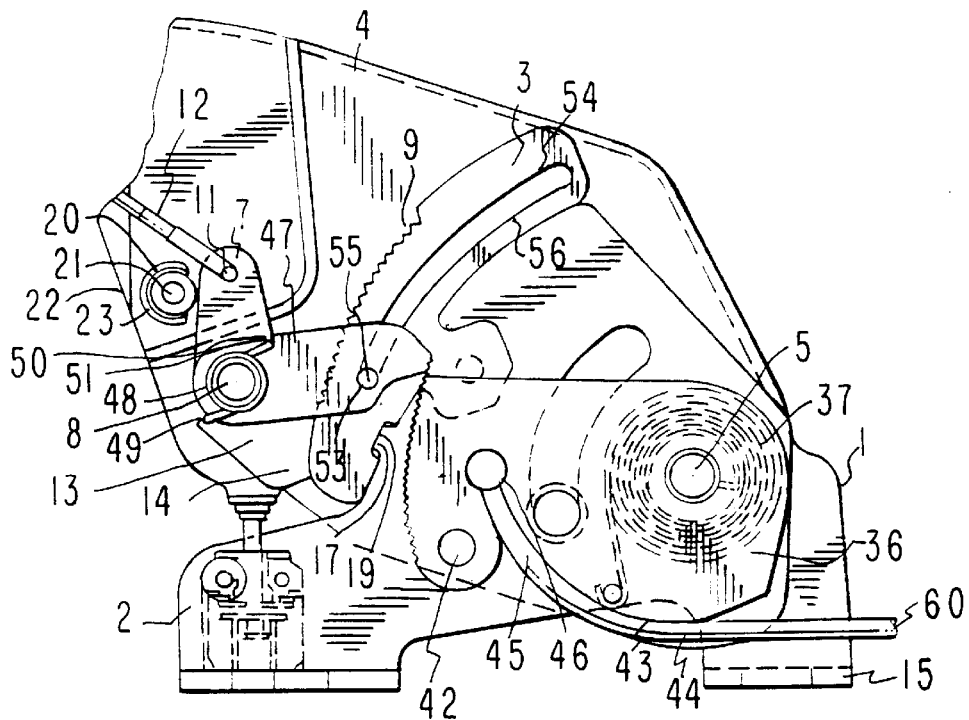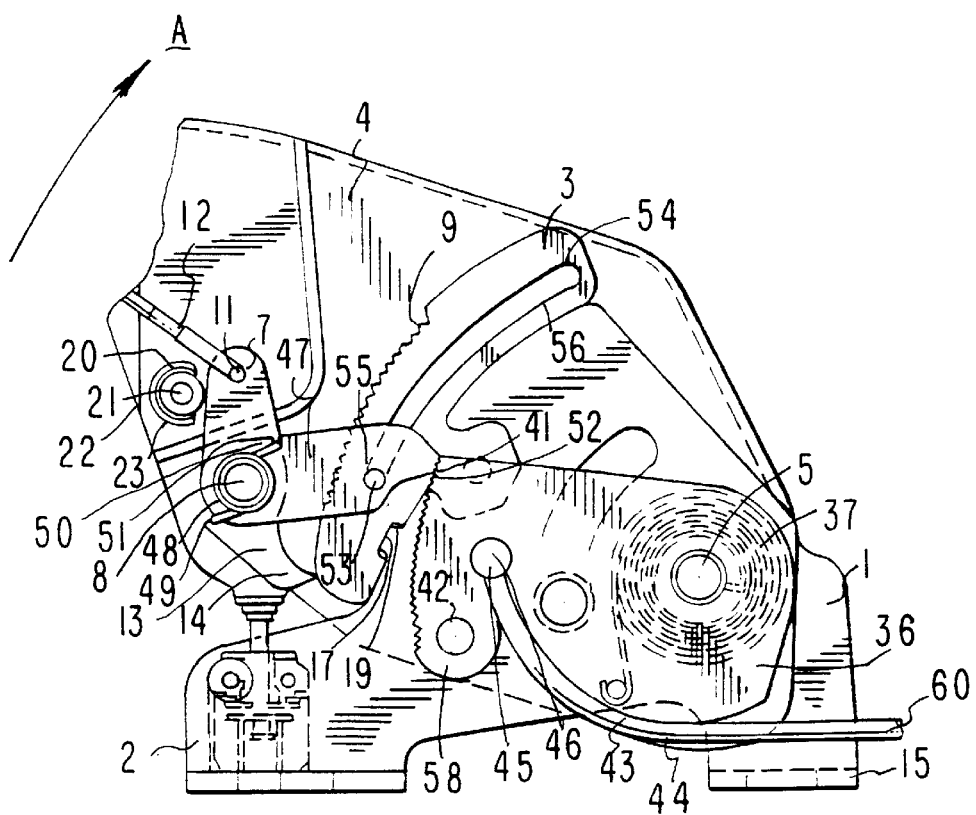

SECURITY BRAKE MECHANISM

BACKGROUND OF THE INVENTION

The object of the invention is a safety brake mechanism applicable to automobile vehicles; more specifically the invention relates to a safety brake mechanism, also termed emergency brake, usually employed when the vehicle is parked, in order to ensure immobilization of the vehicle. The brake mechanism of the invention has built into its very structure a self-adjusting device and a device for self-regulation of the control cable, consisting in essence of a sheathed steel cable which links the safety brake mechanism with the mechanism which moves the brake shoes or pads of the wheels linked to the safety brake mechanism. The self-adjusting device has the purpose, during mounting of the safety brake mechanism of the invention on the vehicle, of initially adjusting the length of the sheathed portion of said control cable; the purpose of this initial adjustment is to adapt the control cable to the service conditions envisaged by taking up the length tolerances presented by each particular vehicle. The self-regulating device has the purpose of permanently and automatically adjusting the length of said sheathed portion of the control cable to adapt it to the service conditions for which it is designed ex-works, thereby compensating for wear of the braking parts, such as the brake shoes and/or pads.

Known in the art are many embodiments of safety brake mechanisms, generally made up of the following parts: a brake lever mounted inside the driving compartment, which can be operated by the user which is coupled by means of a pivot pin to a support fixed to the structure of the vehicle, the brake lever being attached to the corresponding end of the control cable which links the brake mechanism with the mechanism which moves the brake shoes or pads; a ratchet mechanism made up of a lever coupled to the brake lever by means of a pivot pin and so adapted that one of its arms, the power arm, is linked with a control device which can be operated by the user, and its other arm, the resisting arm, has a retaining extension which meshes into a toothed mechanism mounted on the support, with both arms, the power arm and the resisting arm, being submitted to the action of a spring which tends permanently to mesh the retaining extension of the resisting arm into the toothed mechanism of the support; a stop fixed onto the brake lever which stops in the corresponding direction the rotation of the power arm of the ratchet mechanism lever; and some stops attached to the support which fix the end positions of the brake lever. The parts described above make up many known embodiments of safety brake mechanisms, this independently of the mode of operation of the brake lever and of the ratchet lever control device; that is, said parts make up both those known embodiments of safety brake mechanisms operated by hand in which the ratchet control device is set into the handle of the brake lever and those embodiments of safety brake mechanisms in which the brake lever is operated by a pedal provided for the purpose, and the ratchet control device is mounted at any suitable point of the driving compartment, usually near the dashboard.

In general, the known embodiments of safety brake mechanisms use for the initial adjustment of said sheathed portion of the control cable a self-adjusting device fitted ex-works onto the control cable itself and external to the safety brake mechanism, so that, once said safety brake mechanism and control cable have been fitted on the vehicle, operation of the self-adjusting device permits initial adjustment of the length of said sheathed portion of the control cable. As an example of embodiment of a self-adjusting device for the length of the sheathed portion of control cables we might cite that published by European patent application 9392194.1; this self-adjusting device includes an adjustment stem fixed by one of its ends to the corresponding end of the control cable sheath, and a base body secured to a fixed point of the vehicle structure, with both parts, stem and base body, being coaxial to each other and provided with respective and complementary retaining means which fix the portion of stem housed in the base body, and consequently the length of the sheathed portion of the control cable. The described arrangement of the known embodiments of safety brake mechanisms and self-adjusting device has the following main disadvantages: a) it makes the control cable, and consequently the safety brake, considerably more expensive; b) it increases the costs of installation of the safety brake, given the operations involved in fitting of the self-adjusting device on the vehicle. Moreover, said self-adjusting device permits only the initial adjustment of the sheathed cable portion of the control cable, so that every so often the cable has to be adjusted manually to adapt the control cable to the planned service conditions, this adjustment involving, firstly, immobilization of the vehicle and, secondly, the attendant economic cost.

SUMMARY OF THE INVENTION

A safety brake device of new structure and operation is made known in order to provide a solution to all the disadvantages described above.

The safety brake mechanism of the invention has built into its structure a self-adjusting device and a self-regulating device, and comprises the parts detailed below. A support fixed to the structure of the vehicle and provided with retaining toothing. A brake lever which can be moved by the user between two positions, rest position and braking position, respectively, linked by means of a pivot pin to the support. A ratchet comprising a lever fixed to the brake lever by means of a pivot pin, on which the power arm of the ratchet lever is linked to a control device which can be operated by the user, while the resisting arm has a retaining extension provided with toothing which coincides with that of the support retention, with both arms, the power and resisting arms, being submitted to the action of a spring which, linked to the control device, exerts a rotation torque which tends permanently to mesh the retaining extension of the resisting arm with the retention toothing of the support. A stop attached to the brake lever which, in the direction of rotation imparted by the action of said spring attached to the control device, fixes the corresponding end position of the power arm of the ratchet lever. And means for securing the corresponding end of the control cable.

The safety brake mechanism of the invention is characterized in that
 the self-regulating device comprises a traction body, a thrust body and a traction spring on which: the traction body is coupled to the pivot pin of the brake lever and can be rotated in both directions, having traction toothing which, with respect to said pivot pin, describes a circumference arc, and means of securing the corresponding end of the steel cable of the control cable; the thrust body is coupled to the pivot pin of the ratchet lever and to the support and has thrust toothing matching the traction toothing of the traction body, the coupling of the thrust body with the pivot pin of the ratchet being implemented in such a way that the thrust body can be rotated in both directions, and the coupling of the thrust body with the support being implemented by means of a guide-projection which can slide by means of a guide groove arranged complementarily on the support on which can be distinguished longitudinally two curved portions linked by means of a step, one first portion, or disengagement portion, in which, when the brake lever is in the rest position, the guide projection situates the thrust body in disengagement position from the traction body, and a second portion, or engagement portion, in which by rotation of the brake lever from the rest position to the braking position and vice versa, the guide projection situates the thrust body in mesh with the traction body, making it rotate about the pivot pin of the brake lever and the corresponding traction or thrust from the end of the steel cable of the control cable; and the traction spring is mounted coaxially with respect to the pivot pin of the brake lever and works permanently under traction, having one of its ends fixed to the support and its other end fixed to the traction body, in such a way that the latter, when the brake lever is in rest position, permanently subjects to traction the end of the steel cable of the control cable, thereby permanently adjusting the length of its sheathed portion, and the self-adjusting device includes, on the traction body and on the support, respective through-orifices which are superimposed on each other ex-works and traversed by a retaining pin, all this so designed that initially, with the brake lever in rest position, that is with the thrust and traction bodies out of mesh, and the control cable fitted, removal of the retaining pin leads by elastic reaction of the traction spring to rotation of the traction body around the pivot pin of the brake lever, thereby subjecting to traction the end of the steel cable of the control cable and adjusting the initial length of its sheathed portion to the expected service conditions.

Another characteristic of the safety brake mechanism of the invention consists in the fact that coupling of the thrust body with the pivot pin of the ratchet lever is implemented by means of a positioning spring, one end of which rests against the resisting arm of the lever, while the other end rests against the thrust body, so that it exerts upon the thrust body a rotation torque which tends permanently to engage it with the traction body.

Another characteristic of the safety brake mechanism of the invention consists in the fact that on the traction body the means of securing of the corresponding end of the steel cable include a curved seat in which said end rests.

Another characteristic of the safety brake mechanism of the invention consists in the fact that the stop which acts on the power arm of the ratchet lever includes a coating of soft material.

The safety brake mechanism of the invention is supplied ex-works with the traction spring compressed and with the retaining pin of the self-adjusting device fitted passing through the orifices provided for the purpose in the traction body and in the support; moreover, the safety brake mechanism is preferably supplied ex-works with the control cable fitted and, as stated above, having one of the ends of the steel cable coupled to the traction body of the safety brake mechanism. Under these conditions, the safety brake mechanism and the control cable are fitted onto the vehicle. As is known, in respect of the steel cable, fitting of the control cable comprises connection of the other end of the steel cable to the operating mechanism of the brake shoes or pads, and in respect of the control cable sheath, securing of both ends of same to corresponding fixed points of the automobile vehicle structure. Once the safety brake mechanism and control cable have been fitted, initial adjustment of the length of the sheathed portion of the control cable simply requires removal of the self-adjusting device retaining pin; indeed, upon withdrawal of the retaining pin from its location the elastic reaction of the traction spring pushes the traction body, rotating it in the direction in which the control cable is subjected to traction, with said rotation continuing until the elastic reaction of the traction spring is equalled by the mechanical stress of the control cable in the opposite direction, at which moment the length of the sheathed portion of the control cable is adjusted and the safety brake mechanism is left under the design service conditions.

Once initial adjustment of the length of the control cable has been carried out as described above, permanent and progressive adjustment to adapt the length of the sheathed portion of the control cable to the envisaged service conditions is implemented by means of the self-regulating device of the safety brake mechanism of the invention. When the brake lever is in the rest position, the arrangement of the self-regulating device is as follows: the traction body occupies the position fixed by the elastic reaction of the traction spring which acts permanently on the control cable, subjecting it to traction, and therefore permanently adjusting the length of its sheathed portion; and the thrust body is unmeshed from the traction body due to its guide projection being in the unengaged portion of the support guide groove. Moreover, the ratchet lever is subjected to the action of the positioning spring of the control device to which it is attached, so that the power arm of the ratchet lever is resting on the stop covered with soft material and the retaining extension of the resisting arm of this lever is disengaged from the retaining toothing of the support. When the user moves the brake lever from the rest position to the braking position, the arrangement of the self-regulating device becomes as follows: immediately after the brake lever leaves the rest position, the guide projection of the thrust body moves to occupy the engagement portion of the support guide groove, leading to engagement of the thrust and traction bodies, which are from this time onwards attached as they rotate around the pivot pin of the brake lever; under these conditions the rotation of the traction body leads to the corresponding traction stress on the control cable and actuation of the actuating mechanism on the brake shoes or pads; once the movement of the brake lever is complete, that is, once the brake lever is in the braking position, the thrust and traction bodies remain engaged due to the position of the guide projection in the engagement portion of guide groove, while the retaining extension of the resisting arm of the ratchet lever is engaged in the retaining toothing of the support, thus leaving the brake lever immobilized in the braking position. When the user moves the brake lever from the braking position to the rest position, the arrangement of the self-regulating device becomes as follows: with the brake lever in the braking position, when the control device linked to the brake lever is operated the rotation of the ratchet lever leads to disengagement of the retaining extension of its resisting arm from the retention toothing of the support, from which time it is possible to move the brake lever from the braking position to the rest position; during rotation of the brake lever the thrust body is meshed with the traction body due to the guide projection being situated on the engagement portion of the support guide groove as described above, while during said travel of the brake lever there arises simultaneous rotation of both thrust and traction bodies and consequent thrust of the control cable and cessation of the action of the movement mechanism on the brake shoes or pads; with the brake lever situated near the rest position, the guide projection of the thrust body moves to occupy the disengagement portion of guide groove, leading to uncoupling of the thrust and traction bodies; from this moment the elastic reaction of the traction spring once again subjects the control cable to traction, adjusting the length of its sheathed portion.

From the above-described characteristics of the safety braking mechanism of the invention and the description of its operation there emerge the advantages it provides and which solve the above-described disadvantages presented by the known embodiments of safety brake mechanisms.

Another advantage deriving from the characteristics of the safety brake mechanism of the invention consists in the fact that, during the travel of the brake lever from the rest position to the braking position, the alternative movements which the ratchet lever can produce with the consequent noise produced by resting of the power arm on the stop is largely dampened by the cover of soft material fitted onto the latter, so that noise deriving from operation of the safety brake mechanism of the invention is thus reduced to practically imperceptible values, thereby notable increasing comfort levels in the vehicle driving/passenger compartment.

BRIEF DESCRIPTION OF THE DRAWINGS

The drawing sheets of the present specification show by way of non-restrictive example the safety brake mechanism of the invention. In said drawings:

FIG. 2 is a side view of the safety brake mechanism of the invention as it is supplied ex-works;

FIG. 3 is a side view of the safety brake mechanism of the invention showing the action of the self-adjusting device;

DETAILED DESCRIPTION OF THE PREFERRED EMBODIMENT

Figure 1:
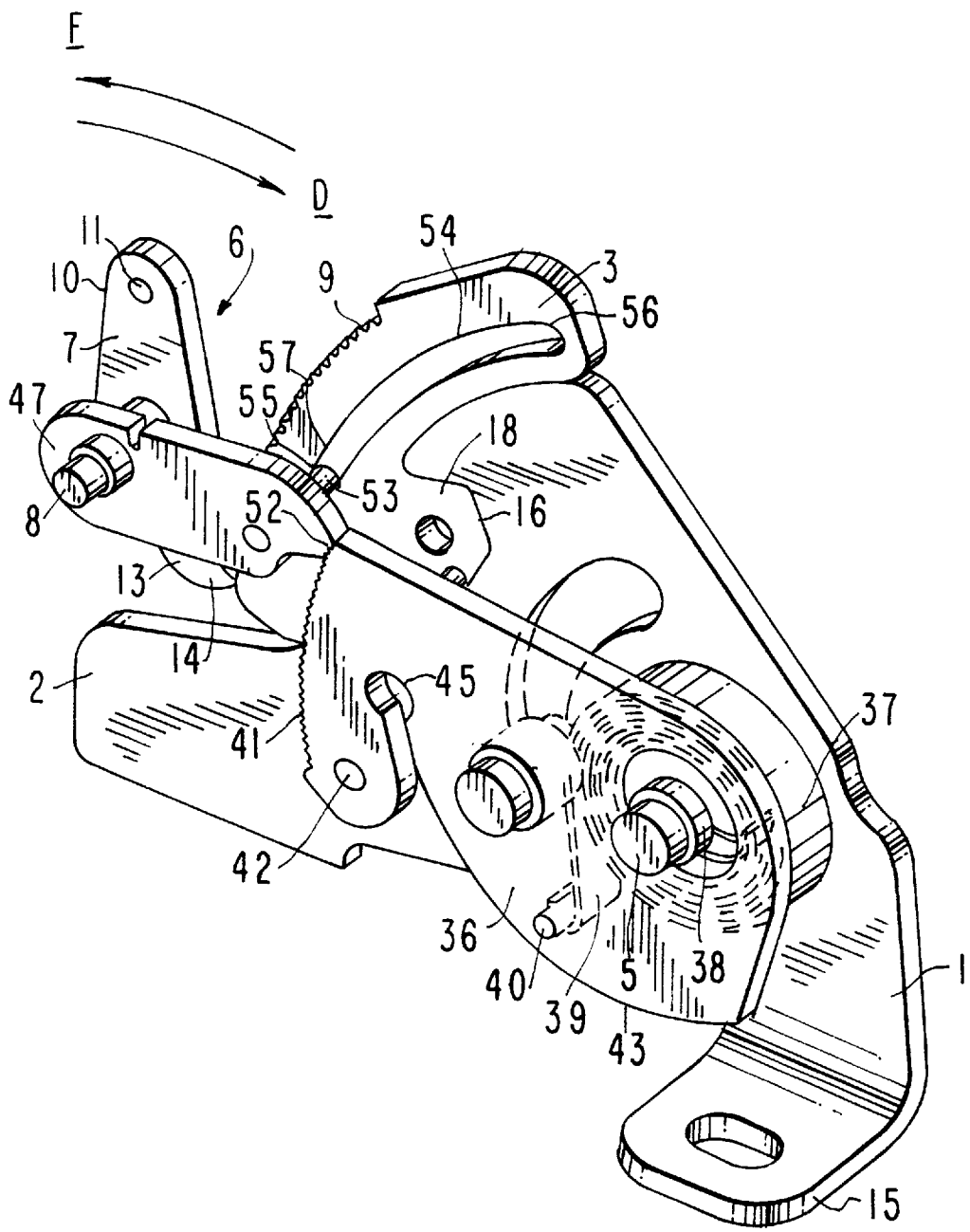
FIG. 1 is a perspective view of the arrangement of the thrust and traction bodies of the safety brake mechanism of the invention.

The safety brake mechanism of the invention shown in the figures of the drawing pages and described as an example of embodiment includes, as parts widely used in known embodiments of safety brake mechanisms, a support 1, made up of an anchorage body 2 and a retaining body 3 attached to each other, a brake lever 4 secured to the support 1 by means of a pivot pin 5, a ratchet 6 made up of a lever 7 fixed to the brake lever 2 by means of a pivot pin 8 and retaining toothing 9 set on the retaining body 3 of the support 1. The power arm 10 of the lever 7 of the ratchet 6 is linked by means of a pivot pin 11 to an actuating bar 12, while the resisting arm 13 of said lever 7 has a retaining extension 14 coinciding with the retaining toothing 9.

The anchorage body 2 of the support 1 has two extensions for anchorage thereof by means of bolts, not shown, to the vehicle structure. The brake lever 4 can be rotated by the user around the pivot pin 5 in both directions, that is, in the direction marked as A in FIG. 3 in order to move the brake lever 4 from the rest position to the braking position, and in the direction marked as B in FIG. 4 in order to move the brake lever from the braking position to the rest position. It is understood that the support 1 can adopt any suitable configuration, which generally depends on the possibilities for location on the vehicle, without this affecting the essential nature of the invention. The brake lever 4 may similarly adopt any suitable configuration without this affecting the essential nature of the invention, the configuration depending above all on whether the actuation of the brake lever 4 is effected by hand or by pedal; in this respect, FIGS. 6 and 7 show the brake mechanism of the invention, shown in FIGS. 1 to 5, provided with a hand-operated control device; for the purpose of greater clarity of outline, and due to its mode of operation being considered to be obvious, no pedal-operated version of the safety brake mechanism of the invention has been shown.

FIG. 1 shows in enlarged form how for mutual coupling of the anchorage 2 and retaining 3 bodies of the support 1 the anchorage body 2 is provided with a groove 16 of polygonal outline and an extension 17, shown in FIGS. 2 to 5, and on the retaining body 3 an extension 18 of polygonal outline and a groove 19, shown in FIGS. 2 to 5, fitting complementarily with said groove 16 and extension 17, respectively, of the anchorage body 2.

Figure 5:
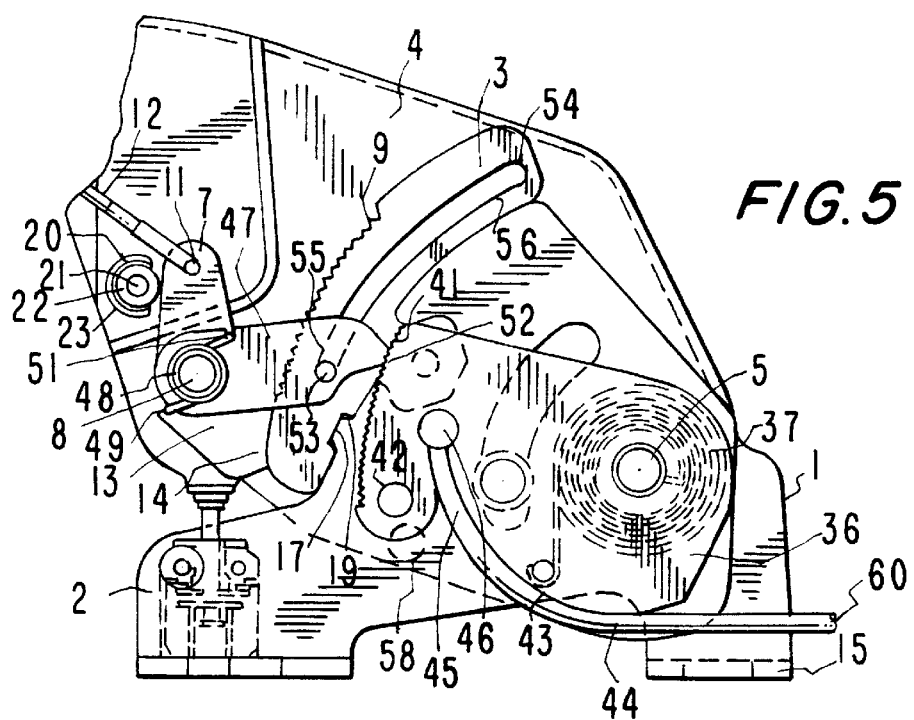
FIG. 5 is a side view of the safety brake mechanism of the invention showing the action of the self-regulating device.
Figure 6:
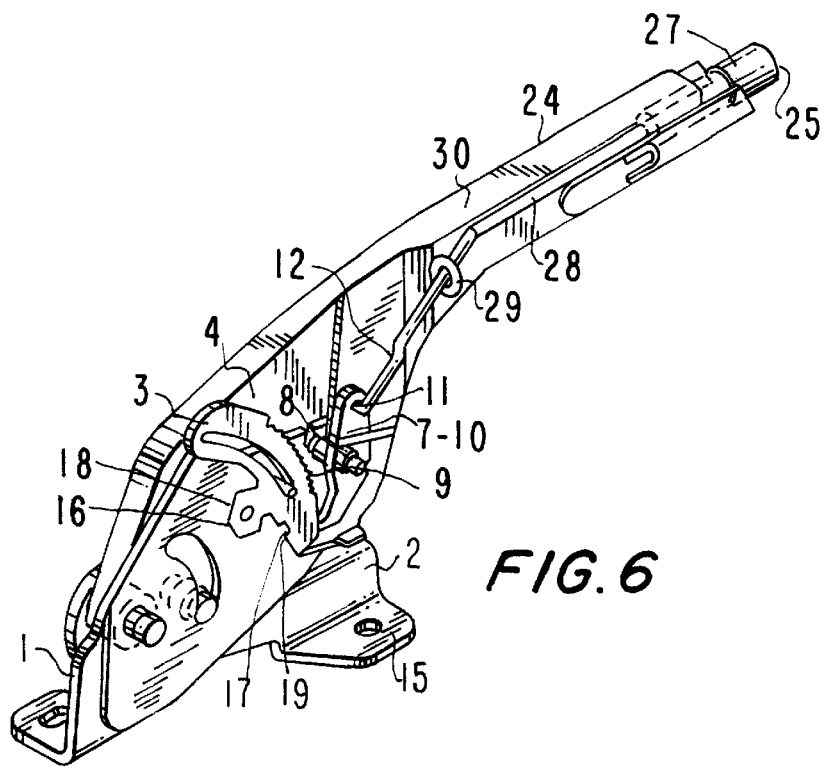
FIG. 6 is a perspective view of the safety brake mechanism of the invention provided with a manually operable control device.
Figure 7:
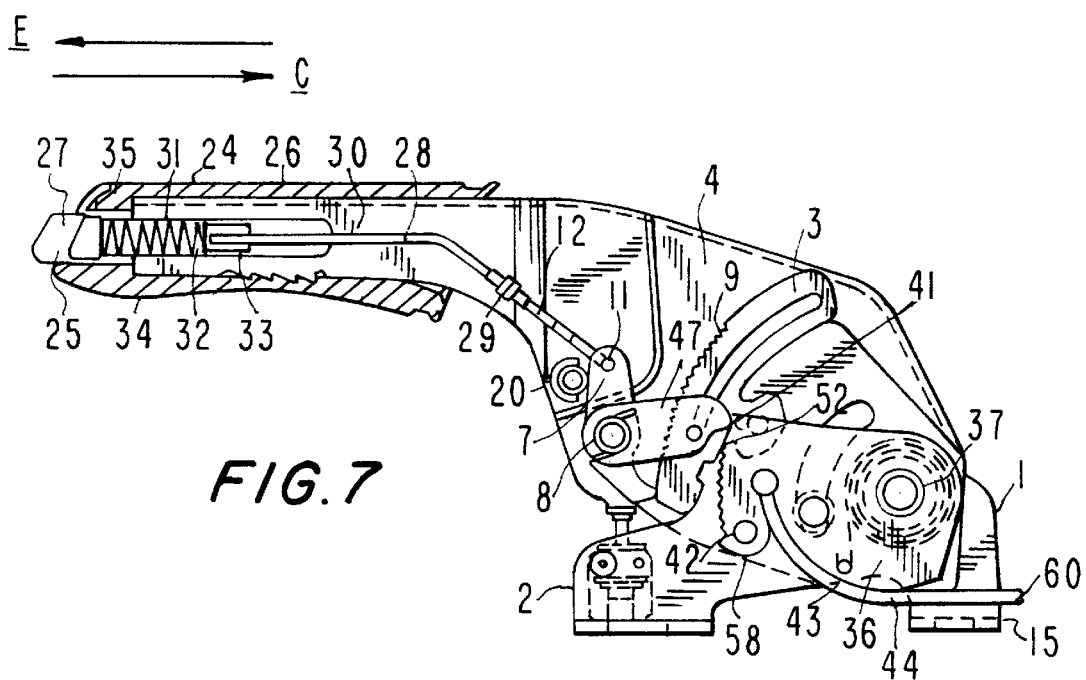
FIG. 7 is a side view of the safety brake device of the invention provided with a manually operable control device.

FIGS. 6 and 7 show how the brake lever 4 is fitted to a hand-actuation device 24 which incorporates a control device 25. The hand-actuation device 24 consists in a prolongation 30 of the brake lever 4 provided with a hand-grip 26 which covers it partially and has the purpose of making it easier for the user to grasp. The control device 25, which acts upon the lever 7 of the ratchet 6, includes a pushbutton 27 coupled onto the actuating rod 12 by a prolongation 28 of same. The actuating rod 12 is fitted with a coaxially mounted spacer 29 whose purpose is to prevent contact between the actuating rod 12 and the brake lever 4, thereby avoiding the generation of abrasion noise between the two parts during operation of the control device 25. Coaxially mounted with respect to the pushbutton 27 and the actuating rod 12 is a recovery spring 31 which works permanently under compression with one of its ends, the interior end 32, resting against a projection 33 from the brake lever 4, while its other end, the exterior end 34, rests against a seat 35 of the pushbutton 27. With this arrangement of the control device 25, the recovery spring 31 tends permanently to situate the pushbutton 27 in the rest position shown in FIGS. 6 and 7. When the pushbutton 27 is operated by the user by pushing it inwards in the direction indicated as C in FIG. 7, the actuating rod 12 is moved in the same direction, causing the power arm 10 of the ratchet 6 lever 7 to rotate in the direction indicated as D while the resisting arm 13 does so in the opposite direction and the recovery spring 31 is subjected to greater compression due to reduction of its length. When the user stops pressing on the pushbutton 27, the latter is driven by elastic reaction of the recovery spring 31 in the direction indicated as E in FIG. 7, while the actuating rod 12 moves in the same direction and the power arm 10 of the ratchet 6 lever 7 rotates in the direction marked F in FIG. 1 and the resisting arm 13 does so in the opposite direction. It should be pointed out here that when the brake lever 4 is in the rest position shown in FIGS. 2, 3, 5 and 7 the arrangement of the retaining toothing 9 prevents engagement of the retaining extension 14 of the resisting arm 13 of the ratchet 6 lever 7.

When the brake lever 4 is in the rest position, the power arm 10 of the ratchet 6 lever 7 rests on a stop 20 fixed to the brake lever 4, which is made up of a core 21, a coating 22 and a sleeve 23 which are coaxial to each other. The coating 22 is made from a soft material and totally surrounds the core 21, while the sleeve 23 partially surrounds the coating 22; the power arm 10 of the lever 7 thus rests on the soft-material coating 22 of the stop 20, thereby achieving silent operation of the ratchet 6 lever 7.

FIG. 1 shows in enlarged form how the pivot pin 5 of the brake lever 4 has fixed onto it a traction body 36 which can rotate around said pin 5 in the directions marked A and B. The traction body 36 has traction toothing 41 which with respect to the pivot pin 5 describes a circumference arc, and a curved seat 43 on which there rests the corresponding end 44 of the of the steel cable 60 of the control cable (not shown), being arranged for firm securing of the end 44 of the steel cable 60 with the traction body 36 of a housing 45 so shaped as to receive with a tight fit a corresponding terminal 46 fixed to said end 44. Mounted coaxially with respect to the pivot pin 5 is a traction spring 37 which works permanently under compression with one of its ends, the interior end 38, resting against the anchorage body 2, and its other end, the exterior end 39, resting against the traction body 36 by means of a support projection 40, in such a way that the traction spring 37 permanently imparts onto the traction body 36 a rotation torque in the direction indicated as A in FIG. 3.

The traction body 36 has a through-orifice 42 so made that, when the safety brake mechanism of the invention is in the same condition as supplied ex-works, shown in FIGS. 1 and 2, it is superimposed upon an orifice 58 of the anchorage body 2, with both orifices traversed by a retaining pin 59 which, under said conditions, fixes the position of the traction body 36 with respect to the anchorage body 2, preventing it rotating in the direction marked A, in which direction there tends the elastic reaction of the traction spring 37.

FIG. 1 shows that there is fixed to the pivot pin 8 of the ratchet 6 lever 7 a thrust body 47 which can rotate in both directions, marked as D and F. Mounted coaxially with respect to said pin 8 is a positioning spring 48, shown in FIGS. 2 to 5, one of the ends of which, the one marked with reference number 49, rests against the resisting arm of the ratchet 6 lever 7, while its other end, marked with reference number 50, rests against the thrust body 47 by means of a groove 51 made for the purpose; thus, when the thrust body 47 rotates in the direction marked F, the positioning spring 48 is subjected to traction and tends, by elastic reaction, to situate the thrust body 47 in its initial position. The thrust body 47 has thrust toothing 52 which coincides with the traction toothing 41 of the traction body 36, and a guide projection 53 permanently housed in a guide groove 54 in the retaining body 3 of the support 1. The guide projection 53 can be slid in both directions along the guide groove 54, which has two curved portions, a disengagement portion 55 and an engagement portion 56, respectively, linked by means of a step 57.

Figure 4:
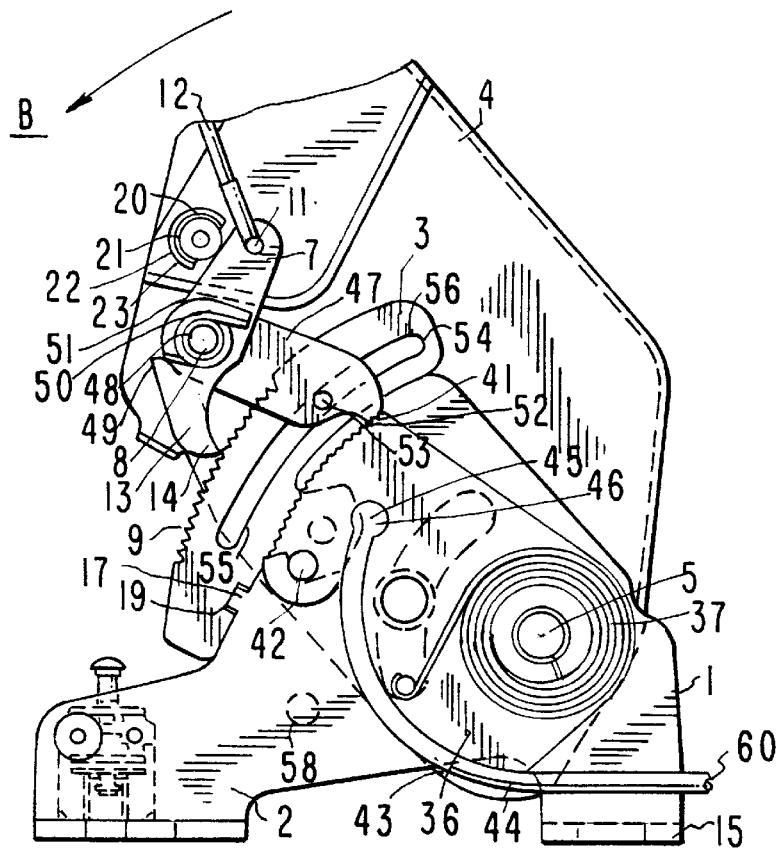
FIG. 4 is a side view of the safety brake mechanism of the invention with its brake lever in the braking position.

Once the safety brake mechanism of the invention has been mounted on the vehicle, that is, when the support 1 is fixed to the vehicle structure, the other end of the steel cable 60 is fixed to the brake shoe or pad actuation mechanism and the ends of the steel cable sheath are fixed to corresponding fixed points of the vehicle structure, the operation of the safety brake mechanism of the invention is described below with reference to FIGS. 2 to 5 of the drawing sheets. For the purposes of achieving greater clarity of outline, the description which follows refers to the safety brake mechanism with hand-operated control device, such as that shown in FIGS. 6 and 7, it being noted that the operation of said mechanism is in no way different if it is operated by means of a pedal fixed to the brake lever 4 and a control device which, mounted at any suitable point, is fixed to the actuating rod 12. With these premises, the example of embodiment of the safety brake mechanism is as follows:

FIG. 2 shows that, as supplied ex-works, the traction body 36 occupies the position fixed by the retaining pin 59, and that in order to proceed to initial adjustment of the length of the sheathed portion of the control cable the user has simply to remove the retaining pin 59 from orifices 42 and 58 of the traction body 6 and from the anchoring body 2, respectively, the traction body 36 then moving in the rotation direction marked A in FIG. 3 due to elastic reaction of the traction spring 37, with that movement of the traction body 36 continuing until the moment when the elastic reaction of the traction spring 37 is equalled by the mechanical stressing of the control cable in the opposite direction, from which moment the length of the sheathed portion of the control cable is adjusted initially;

once the initial adjustment described above has been made, the traction body 36 takes up the position shown in FIG. 3, leaving the self-regulating device in service conditions;

with the brake lever 4 in the rest position shown in FIG. 3, the position of the self-regulating device of the safety brake mechanism is as follows: the traction body 36 and the thrust body 47 are disengaged due to the guide projection 53 being on the disengagement portion 55 of the guide groove 54, and the end 44 of the steel cable 60 fixed to the traction body 36 is subjected permanently to traction by the action of the traction spring 37;

when the user moves the brake lever 4, rotating it in the direction marked A from the rest position to the braking position shown in FIG. 4, the retaining extension 14 of the resisting arm 13 of the ratchet 6 lever 7 meshes successively with the retaining toothing 9 of the retaining body 3, driven by the spring 31 of the control device 25 through the actuating rod 12 fixed to the power arm 10 of said lever 7; during the oscillations of the power arm 10 caused by the successive meshings of the retaining extension 14, the arm rests on the soft-material coating 22 of the stop 20, thereby preventing the noises deriving from said moving action of the brake lever usual in the known embodiments of safety brake mechanisms;

immediately after the start of rotation of the brake lever 4 in the direction marked A, the guide projection 53 leaves the disengagement portion 55 of the guide groove 54 and slides to take up the engagement portion 56, submitting the positioning spring 48 to compression and causing engagement of the toothed sections 41 and 52 of the traction 36 and thrust 47 bodies, respectively, so that the traction body 36 links with the brake lever 4 by means of the pivot pin 8 of the ratchet 6 lever 7, so that the steel cable 60 is subjected to traction and causes operation of the brake shoes or pads actuation mechanism;

in the braking position shown in FIG. 4 the retaining extension 14 of the resisting arm 13 is meshed into the retention toothing 9 of the retaining body 3, and the thrust 47 and traction 36 bodies are meshed into each other due to the guide projection 53 being situated in the engagement portion 56 of the guide groove 54, thereby leaving the braking position of the brake lever 4 fixed and the control cable acting upon the said actuation mechanism;

with the brake lever 4 in the braking position, the thrust of the push button 27 of the control device 25 leads, by means of the actuating rod 12 fixed to the power arm 10 of the ratchet 6 lever 7, to disengagement of the retaining extension 14 from the retaining toothing 9 of the retaining body 3, thus permitting rotation of the brake lever 4 in the direction marked B in FIG. 4, while the traction 36 and thrust 47 bodies remain meshed with each other due to the guide projection 53 being situated on the engagement portion 56 of the guide groove 54 and rotating in the same direction as the gear lever 4, thereby leading to cessation of action upon the brake shoes or pads operating mechanism;

when the brake lever 4 is in a position close to the rest position as shown in FIG. 5, the guide projection 53, driven by elastic reaction of the positioning spring 48, leaves the engagement portion 56 of the guide groove 54 and moves onto the disengagement portion 55, thereby causing disengagement of the toothings 41, 52 of the traction 36 and thrust 47 bodies, respectively, with the result that the traction body 36 can then rotate in the direction marked A in FIG. 3, driven by the traction spring 37, with said rotation continuing as long as the traction force of the traction spring 36 on the steel cable 60 is equal to the mechanical stress of the control cable, thereby automatically and permanently adjusting the length of the sheathed portion of the control cable.

I claim:

1. Safety brake mechanism which has built into its structure a self-adjusting device and a self-regulating device, and comprises: a support (1) fixed to the structure of a vehicle and provided with retaining toothing (9); a brake lever (4) which can be moved by a user between two positions, rest position and braking position, respectively, linked by means of a pivot pin (5) to the support (1); a ratchet (6) comprising a lever (7) fixed to the brake lever (4) by means of a pivot pin (8), on which a power arm (10) of the ratchet (6) lever (7) is linked to a control device (25) which can be operated by the user, while a resisting arm (13) has a retaining extension (14) provided with toothing which coincides with that of the retaining toothing (9), with both arms, the power (10) and resisting (13) arms, being submitted to the action of a spring (48) which, linked to the control device (25), exerts a rotation torque which tends permanently to mesh the retaining extension (14) of the resisting arm (13) with the retaining (9) toothing of the support (1); a stop (20) attached to the brake lever (4) which, in the direction of rotation imparted by the action of said spring (48) attached to the control device (25), fixes the corresponding end position of the power arm (10) of the ratchet (6) lever (7); means (45) for securing a corresponding end (44) of a control cable, and which is characterized in that the self-regulating device comprises a traction body (36), a thrust body (47) and a traction spring (37) on which: the traction body (36) is coupled to the pivot pin (5) of the brake lever (4) and can be rotated in both directions, having traction toothing (41) which, with respect to said pivot pin (5), describes a circumference arc; the thrust body (47) is coupled to the pivot pin (8) of the ratchet (6) lever (7) and to the support (1) and has thrust toothing (52) coinciding with the traction toothing (41) of the traction body (36), the coupling of the thrust body (47) with the pivot pin (8) of the ratchet (6) lever (7) being implemented in such a way that the thrust body (47) can be rotated in both directions, and the coupling of the thrust body (47) with the support (1) being implemented by means of a guide-projection (53) which can slide by means of a guide groove (54) arranged complementarily on the support (1) on which can be distinguished longitudinally two curved portions linked by means of a step, one first position, or disengagement portion (55), in which, when the brake lever (4) is in the rest position, the guide projection (53) situates the thrust body (47) in disengagement position from the traction body (36), and a second portion, or engagement portion (56), in which by rotation of the brake lever (4) from the rest position to the braking position and vice versa, the guide projection (53) situates the thrust body (47) in mesh with the traction body (36), making it rotate about the pivot pin (5) of the brake lever (4); and the traction spring (37) is mounted coaxially with respect to the pivot pin (5) of the brake lever (4) and works permanently under traction, having one of its ends fixed to the support (1) and its other end fixed to the traction body (36), in such a way that the traction body (36), when the brake lever (4) is in a rest position, permanently subjects to traction the end (44) of the control cable, thereby permanently adjusting the length of its sheathed portion, and the self-adjusting device includes, on the traction body (36) and on the support (1), respective through-orifices (42, 58) which are superimposed on each other and traversed by a retaining pin (59), all this so designed that initially, with the brake lever (4) in rest position, that is with the thrust (47) and traction (36) bodies out of mesh, and the control cable fitted, removal of the retaining pin (59) leads by elastic reaction of the traction spring (37) to rotation of the traction body (36) around the pivot pin (5) of the brake lever (4), thereby subjecting to traction the end (44) of the control cable and adjusting the initial length of its sheathed portion to the expected service conditions.

2. Safety brake mechanism as claimed in claim 1, characterized in that coupling of the thrust body (47) with the pivot pin (8) of the ratchet (6) lever (7) is implemented by means of a positioning spring (48), one end (49) of which rests against the resisting arm (13) of the lever (7), while the other end (50) rests against the thrust body (47), so that it exerts upon the thrust body (47) a rotation torque which tends permanently to engage it with the traction body (36).

3. Safety brake mechanism as claimed in claim 1, characterized in that on the traction body (36) the means of securing of the corresponding end (44) of the control cable include a curved seat (43) in which said end (44) rests.

4. Safety brake mechanism as claimed in claim 1, characterized in that the stop (20) which acts on the power arm (10) of the ratchet (6) lever (7) includes a coating (22) of soft material.

* * * * *